United States Patent [19]

Chan

[11] Patent Number: 5,132,367

[45] Date of Patent: Jul. 21, 1992

[54] NCO-FREE RESINS USEFUL AS A SUBSTITUTE FOR POLYURETHANES

[75] Inventor: Paul S. L. Chan, Winnipeg, Canada

[73] Assignee: Guertin Bros. Coatings and Sealants Ltd., Winnipeg, Canada

[21] Appl. No.: 749,515

[22] Filed: Aug. 19, 1991

Related U.S. Application Data

[63] Continuation of Ser. No. 259,033, Oct. 17, 1988, abandoned.

[51] Int. Cl.$^5$ .................. C08L 75/04; C08L 75/16
[52] U.S. Cl. ............................ 525/131; 525/127
[58] Field of Search ............................ 525/131, 127

[56] References Cited

U.S. PATENT DOCUMENTS

| | | |
|---|---|---|
| 2,480,810 | 8/1949 | Jones . |
| 2,500,265 | 3/1950 | Walling et al. . |
| 3,607,834 | 9/1971 | Marx et al. . |
| 3,689,593 | 9/1972 | Jackson . |
| 3,850,770 | 11/1974 | Juna et al. . |
| 3,954,714 | 5/1976 | Kuehn . |
| 3,993,849 | 11/1976 | Victorius . |
| 4,034,017 | 7/1977 | Chang et al. . |
| 4,089,763 | 5/1978 | Dart et al. . |
| 4,112,017 | 9/1978 | Howard . |
| 4,243,578 | 1/1981 | O'Sullivan et al. . |
| 4,408,018 | 10/1983 | Bartman et al. ................ 525/300 |
| 4,422,914 | 12/1983 | Tsao et al. . |
| 4,687,813 | 8/1987 | Lenz et al. ...................... 525/131 |
| 4,766,177 | 8/1988 | Miller et al. .................... 525/131 |
| 4,786,682 | 11/1988 | Perez et al. ..................... 525/127 |
| 4,818,791 | 4/1989 | Murakami et al. .............. 525/131 |
| 4,826,921 | 5/1989 | Andrews et al. ................ 525/131 |
| 5,017,649 | 5/1991 | Clemens ........................... 525/59 |
| 5,051,529 | 9/1991 | Witzeman et al. ............... 560/178 |

FOREIGN PATENT DOCUMENTS

| | | |
|---|---|---|
| 4080785 | 10/1985 | Australia . |
| 0287842 | 10/1988 | European Pat. Off. . |
| 3710431 | 10/1988 | Fed. Rep. of Germany . |
| 8502506 | 10/1985 | South Africa . |
| 8101292 | 5/1981 | World Int. Prop. O. ........ 525/131 |
| 88/07556 | 10/1988 | World Int. Prop. O. . |

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

Compositions obtained by curing an acetoacetylated poly(meth)acrylic or polyester-based resin and a NCO-free urethane polymer having vinylic end groups is disclosed.

22 Claims, No Drawings

NCO-FREE RESINS USEFUL AS A SUBSTITUTE FOR POLYURETHANES

This application is a continuation of application Ser. No. 07/259,033, filed on Oct. 17, 1988, now abandoned.

BACKGROUND OF THE INVENTION

1. Field of the Invention

The present invention relates to NCO-free resins and coatings possessing the outstanding performance characteristics of polyurethanes.

2. Discussion of the Background

For the past several decades, urethane coatings, blocked urethanes, etc. have been very successfully used as polymers for coating and engineering polymers. They have been formulated to achieve outstanding results for the industry.

Most commonly, urethanes are prepared by a reaction in which free isocyanates (NCO) are reacted with various other groups in a two-package system. Recent environmental toxological studies however indicate that it is very desirable to eliminate free NCO groups from uncured polymers coatings. This would prevent exposure of this toxic material to humans during manufacture, application and in the final product, and the product would be very stable because no NCO groups would be available to react with moisture, etc. To date no satisfactory solution to this problem is available.

There is thus a strongly felt need for NCO-free resins and coatings possessing the outstanding performance of urethane materials. Notably there is a strongly felt need for NCO-free resins ad coatings possessing the following advantages: high gloss, high impact resistance, good hardness and flexibility, good solvent and chemical resistance, good UV resistance in weathering, and good room temperature cure.

SUMMARY OF THE INVENTION

Accordingly, one object of this invention is to provide novel NCO-free resins and cured products thereof possessing the outstanding performance characteristics of urethane materials.

It is another object of this invention to provide novel NCO-free resins and cured products thereof possessing high gloss characteristics.

It is another object of this invention to provide novel NCO-free resins and cured products thereof possessing high impact resistance.

It is another object of this invention to provide novel NCO-free resins and cured products thereof possessing good hardness and flexibility characteristics.

It is another object of this invention to provide novel NCO-free resins and cured products thereof possessing good solvent and chemical resistance.

It is another object of this invention to provide novel NCO-free resins and cured products thereof possessing good UV resistance and weathering characteristics.

It is another object of this invention to provide novel NCO-free resins which cure rapidly at room temperature.

It is another object of this invention to provide a two component kit for preparing NCO-free resins and cured products thereof which have a long life.

The inventor has now discovered NCO-free resins and coatings which satisfy all of the above objects of this invention, and other objects which will become apparent from the description of the invention given hereinbelow.

These NCO-free resins and coatings are obtained by curing a two-component mixture. The first component of the mixture is at least one polymer carrying acetoacetyl groups. The second component of this mixture is at least one NCO-free urethane bearing at least two unsaturated end groups (i.e. vinylic end groups). This mixture is cured in the presence of a catalyst having a pKa of 12 to 14.

DETAILED DESCRIPTION OF THE PREFERRED EMBODIMENTS

The present invention uses two different polymers possessing acetoacetyl groups: an acetoacylated (meth)acrylic resin and an acetoacetylated polyester. These two different polymers possessing acetoacetyl groups can be either used individually or together in preparing the cured products provided by this invention which includes coatings, articles, adhesives, etc. (vide infra).

Acetoacetylated (meth)acrylic resin

In one embodiment, the acetoacetylated acrylic resin is obtained by copolymerizing a mixture containing 10 to 60 wt. %, preferably 15 to 35 wt. %, of at least one monomer of formula (I):

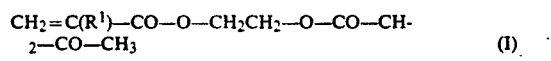

$$CH_2=C(R^1)-CO-O-CH_2CH_2-O-CO-CH_2-CO-CH_3 \quad (I)$$

and 40 to 90 wt. %, preferably 65 to 85 wt. %, of at least one alkyl (meth)acrylate of formula (II):

$$CH_2=C(R^1)-CO-O-R \quad (II)$$

wherein R is a $C_{1-12}$ linear or branched saturated alkyl group and $R^1$ is a hydrogen atom or a methyl group.

In another embodiment, the acetoacylated (meth)acrylic resin is obtained by copolymerizing a mixture containing the same ratios as above of at least one monomer of formula (I) together with at least one alkyl (meth)acrylate of formula (II), and in addition 10 to 50 wt. % of styrene.

These acetoacetylated (meth)acrylic resins have a molecular weight, $\overline{M}_n$, of from 10,000 to 16,000, preferably 13,000 to 15,000. ($\overline{M}_n$ = number average molecular weight.)

The acetoacylated (meth)acrylic resins may be prepared by polymerization of the monomers by conventional methods using conventional polymerization catalysts. The polymerization is preferably carried out using free-radical-forming catalysts in solution or in emulsion. Conventional emulsifiers and/or protective colloids may be used when the copolymers are prepared in aqueous emulsion.

When the polymer is prepared in solution, in addition to water, suitable organic solvents which can be used include aromatic hydrocarbons such as benzene, toluene and xylene, ketones such as methylethylketone, esters of saturated carboxylic acids such as ethylacetate, butylacetate and methylglycolacetate, alcohols such as methanol, ethanol, isopropanol, n-butanol, isobutanol and glycols and also glycol ethers, for example the methylether of ethylene glycol.

Acetoacetylated polyester resin

The polyester functionalized with acetoacetyl groups can be obtained in one of two ways.

In one embodiment, the polyester and a $C_{1-4}$ acetoacetate, e.g. methyl acetoacetate, are subjected to a transesterification reaction. The polyester used has a molecular weight, $\overline{M}_n$, of 1,000 to 10,000, preferably 1,200 to 8,000, and possesses hydroxyl groups. The hydroxy group-containing polyesters may contain, as the acid derived moiety, moieties derived from benzoic acid, p-t-butyl benzoic acid, capric acid, caproic acid, dimethylol propionic acid, α-ethyl butyric acid, 2-ethyl hexanoic acid, adipic acid, azelaic acid, dimethyl glutarate, fumaric acid, isophthalic acid, maleic anhydride, terephthalic acid, citric acid, trimellitic anhydride, pyromellitic dianhydride, and combinations of two or more of these.

The hydroxy compound derived moiety may be derived from amyl alcohol, benzyl alcohol, butyl alcohol, cetyl alcohol (hexadecanol), ethyl alcohol, α-ethyl hexyl alcohol, hexyl alcohol, isobutyl alcohol, isopropyl alcohol, methyl alcohol, octyl alcohol, pentyl alcohol, propyl alcohol, 1,3-butane diol, 1,4-butane diol, 1,2-, 1,3- or 1,4-cyclohexanedimethanol, diethylene glycol, dimethylol propionic acid, dipropylene glycol, ethylene glycol, Ester Diol 204, 1,6-hexanediol, hexylene glycol, neopentyl glycol, 1,5-pentanediol, propylene glycol, tetraethylene glycol, triethylene glycol, trimethylene glycol, trimethylpentanediol, glycerine, trimethylol ethane, trimethylol propane, tris(hydroxyethyl)isocyanurate, pentaerythritol, and combinations of two or more of these.

The polyesters have a hydroxyl group content of from 150 to 900 equivalent weight (solids), preferably 150 to 750 equivalent weight, —OH (solids).

The transesterification reaction is carried out using conventional methods using conventional transesterification catalysts. The polyester is reacted with the $C_{1-4}$ alkyl acetoacetate in the presence of a transesterification catalyst to give the acetoacetoxy-resin and a low molecular weight $C_{1-4}$ alkyl alcohol which is distilled off. Any well known transesterification catalyst may be used, e.g. an acid catalyst like trichloroacetic acid. At least 75% and up to 100%, of the polyester hydroxyl group are esterified.

In another embodiment, the polyester functionalized with acetonacetyl groups is obtained by subjecting to standard free radical graft polymerization reaction conditions an unsaturated polyester with a monomer of formula (I):

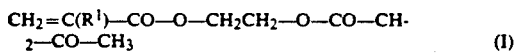

to obtain a product in which at least 70% and up to 100% of the thylenically unsaturated groups in the unsaturated polyester have been reacted.

The unsaturated polyester starting material used has a molecular weight, $\overline{M}_n$, of from 1500 to 8,000 preferably 1,500 to 3,500. The diacid component of the unsaturated polyester includes, for example, moieties derived from fumaric acid, maleic acid, itaconic acid, citraconic acid, mesaconic, aconitric acid, and mixtures of two or more of these diacids. Unsaturated polyesters containing fumaric and/or maleic acid-derive moieties are preferred.

The diol component of the unsaturated polyester includes, for example, moieties derived from ethylene glycol, propylene glycol, diethylene glycol ($HOCH_2CH_2OCH_2CH_2OH$), triethylene glycol ($HO(C_2H_4O)_2H_2OH$), polyethylene glycol, dipropylene glycol (mixed isomers), polypropylene glycol, 1,3-butane diol, 1,4-butane diol, 1,6-hexanediol, neopentyl glycol, 1,2-, 1,3- or 1,4-cyclohexanedimethanol, 1,1,4-trimethyl pentane diol, bishphenol A, trimethylolethane, trimethylolpropane, dicyclopentadiene glycol, dimethylol propionic acid, Ester Diol 204, hexylene glycol, 1,5-pentane diol, tetraethylene glycol, monools of allyl ethers, and mixtures of at least two of the diols. The unsaturated polyester may optionally contain from 10 to 50 wt. % of styrene-derived units.

NCO-free urethane functionalized with unsaturated end groups

The NCO-free urethane polymer may be a urethane polymer having at least two (meth) arylate end groups. This polymer can be obtained using one of two different procedures.

In the first procedure, a $C_{2-12}$ linear, branched or cyclic alkyl or arylpolyol having an average of from 2 to 4 hydroxyl groups per molecule is reacted together with a $C_{2-12}$ linear, branched or cyclic saturated alkyl or aryl diisocyanate, triisocyanate or tetraisocyanate, or a mixture of these, at a temperature of from 5° to 20° C. using any known conventional catalyst. The reactants are then heated to a temperature of from 40° to 150° C. and held at this temperature for a period of time sufficient to reduce the NCO content of the reaction mixture to 4 to 20 wt. %.

A hydroxy substituted alkyl (meth)acrylate of formula (III):

wherein $R^1$ is a hydrogen atom or a methyl group, and $R^2$ is a $C_{2-3}$ linear or branched saturated alkylene is then added to the reaction mixture. Together with the hydroxy-substituted alkyl (meth)acrylate of formula (III) other vinyl group-containing monomers and polymers may be added optionally with suitable stabilizers. These vinyl containing monomers can be any monomer possessing an α,β-unsaturated esters functionality. The stabilizer may, for example, the monomethyl ether hydroquinoline (METHQ) which may be used in an amount of 100 to 500 ppm, preferably 150 to 250 ppm.

The reaction temperature is maintained at 40° to 150° C. until the NCO content of the reaction mixture approaches 0 wt. %, i.e. until the NCO content is not more than 4 wt. %, preferably not more than 2 wt. %, and most preferably not more than 1 wt. %. At this time an aliquot of a $C_{1-4}$ alkyl alcohol, such as methanol, ethanol, etc. is added while maintaining the reaction temperature at from 40° to 150° C. until no detectable NCO is obtained. The $C_{1-4}$ alkyl alcohol is added in an amount corresponding to a OH to NCO ratio of at least 1.5, preferably 1.5 to 3.0, most preferably 1.5 to 2.0 The temperature is maintained at 40° to 150° C. until the NCO content reaches a 0.0% NCO as determined by the standard ASTM D 2572-70 (di-butylamine).

Thus in this embodiment, among others, a NCO-free urethane functionalized with unsaturated end groups and of formula (VI) is obtained:

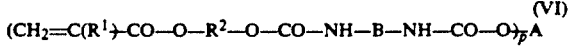

In formula (VI), p is an integer of from 2 to 4. Each $R^1$ is independently a hydrogen atom or a methyl group. Each $R^2$ is independently a $C_{2-3}$ linear or branched saturated alkylene. Each B is independent a $C_{2-12}$ linear or branched saturated alkylene, or a $C_{4-12}$ cyclic saturated alkylene, or a $C_{6-12}$ arylene. And A is a $C_{2-12}$ linear or branched saturated alkylene group or a $C_{4-12}$ cyclic saturated alkylene group.

The material of formula (VI) is obtained when a diisocyanate is used. However it will be recognized that products having different structures are obtained when triisocyanates and/or tetraisocyanates are used.

In another embodiment, using the process outlined above, a diol is sequentially reacted with a diisocyanate, then with a hydroxy-substituted alkyl (meth)acrylate of formula (III) and then with the $C_{1-4}$ alkyl alcohol to obtain a product of formula (IV):

$$CH_2=C(R^1)-CO-O-R^2-O+CO-NH-B-NH-CO-O-A-O\overline{)_n}CO-NH-B-NH-CO-O-R^2-O-CO-C(R^1)=CH_2. \quad (IV)$$

In formula (VI) each $R^1$ is independently hydrogen or methyl. Each $R^2$ is independently a $C_{2-3}$ linear or branched saturated alkylene. Each B is independently a $C_{2-12}$ linear or branched saturated alkylene, or a $C_{4-12}$ cyclic saturated alkylene, or a $C_{6-12}$ arylene. Each A is independently a $C_{2-12}$ linear or branched saturated alkylene, or a $C_{4-12}$ cyclic saturated alkylene. And n is 1 to 4 for coatings and 1 to 10 for elastomers.

In another embodiment, the NCO-free urethane functionalized with unsaturated terminal groups is obtained by reacting a diisocyanate and/or a triisocyanate and/or a tetraiisocyanate with a hydroxy-substituted alkyl (meth)acrylate of formula (III) to obtain a product of the formula (V):

$$(CH_2=C(R^1)+CO-O-R^2-O-CO-NH\overline{)_m}X \quad (V)$$

wherein variables $R^1$ and $R^2$ are as defined above, X is the diisocyanate, triisocyanate or tetraiisocyanate nucleus or a mixture thereof, and m is 2, 3 or 4.

To obtain the compound of formula (V) the diisocyanate and/or triisocyanate and/or tetraiisocyanate is reacted with the hydroxy substituted alkyl (meth)acrylate formula (III) at a temperature of from 40° C. to 150° C. for a length of time necessary to reduce the NCO content of the reaction mixture to 4 to 20 wt. %. The hydroxy substituted alkyl (meth)acrylate may be used together with other $\alpha,\beta$-unsaturated esters and with vinyl containing monomers and polymers and with suitable stabilizers.

The reaction temperature is maintained until the NCO content approaches 0 wt. %, i.e. is less than 4 wt. %, preferably less than 2 wt. % and most preferably less than 1 wt. %, at which time an aliquot of a $C_{1-4}$ alcohol similar to that described above is added while maintaining the reaction temperature until no detectable NCO is obtained (i.e. until the NCO content is 0.0% as defined by ASTM D 2572-70 (di-butylamine). As discussed supra, the $C_{1-4}$ allyl alcohol is added in an amount corresponding to a NCO to OH ratio of at least 1.5, preferably 1.5 to 20. The product thus obtained has a molecular weight $\overline{M}_n$, of 200 to 8,000 preferably 400 to 4,000.

When the NCO-free urethane functionalized with unsaturated end groups is prepared (e.g. from a diol to obtain the material of formula (IV) or from a polyol to obtain the material of formula (VI)), it will be appreciated that a molar excess of the isocyanate (viz. the diisocyanate, triisocyanate and/or tetraiisocyanate) over the hydroxy compound must be used in the preparation of the prepolymer. In this reaction formation of the isocyanate-prepolymer may be assisted by the use of catalysts known in the art to assist polyurethane formation. For example, these include tertiary amines, and methyl salts, e.g. stannous octoate and particular dibutyl tin dilaurate.

The reaction of the hydroxy compound and the isocyanate may produce a viscous urethane prepolymer and, especially when the degree of polymerization is large, the prepolymer may be solid. It is desirable in these circumstances that the reaction of the hydroxy compound and the isocyanate be effected in the presence of an inert diluent. Similarly, where the urethane prepolymer is very viscous or solid, further reaction of the prepolymer is desirably effected in the presence of an inert diluent.

The diluent should be substantially free of groups which are reacted with isocyanate groups, at least to such an extent that the diluent does not interfere with the formation of the prepolymer. In the preparation of the material of formula (VI), the diluent can of course be the hydroxy substituted (meth)acrylate of formula (III).

When the urethane prepolymer is prepared in an inert diluent, the prepolymer may be separated from the diluent, e.g. by evaporation of the diluent or by the addition to the diluent of a non-solvent or the prepolymer.

The $C_{2-12}$ linear, branched or cyclic alkyl or aryl polyol which can be used in the present invention include methylene glycol, propylene glycol, butylene glycol, glycerine, trimethylolethane (TME), trimethylolpropane (TMP) and pentaerythritol, or combinations of these materials.

Examples of diols and polyols which do not have cyclic groups in the chain include, for example, ethylene glycol and propylene glycol, in which case A has the structure $$-CH_2-CH_2-, \quad -CH_2-\overset{CH}{\underset{|}{CH}}-$$

Butylene glycol, diethylene glycol 1,3-butane diol, 1,4-butane diol, dipropylene glycol, 1,6-hexanediol, hexylene glycol, neopentyl glycol, 1,5-pentanediol, tetraethylene glycol, triethylene glycol, trimethylene glycol, trimethyl pentane diol, trimethylol ethane, or trimethylol propane, and derivatives of these materials in which one or more of the carbon atoms are substituted by atoms or groups which are unreactive towards hydroxyl and isocyanate group may be used.

Examples of diols containing cyclic groups which may be used in the preparation of the urethane prepolymer include, for example, cycloalkane diols, e.g. 1,2-, 1,3- or 1,4-cyclohexane diol and a diol having the structure

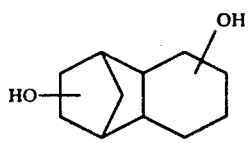

in which case the group A in the urethane prepolymer has the structure

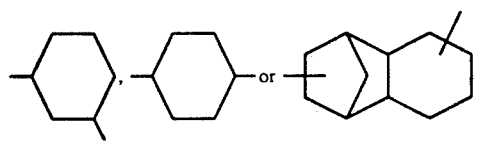

respectively. Other suitable diols include, for example, cycloalkane dialkanols, e.g. 1,2-, 1,3- or 1,4-cyclohexane dimethanol or 1,2-, 1,3- or 1,4-cyclohexane diethanol; polycycloalkane diols, polycycloalkane dialkanols, aryl dialkanols and condensates of alkylene oxides with aromatic compounds containing two phenolic groups.

Other diols which can be used are diols of the structure

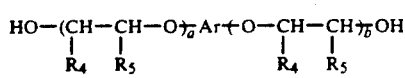

that is, oxyalkylated derivatives of phenolic compounds, where $R_4$ and $R_5$ are hydrogen atoms or $C_{1-4}$ alkyl groups, e.g. methyl, and Ar is a divalent aromatic group in which each free valency is on an aromatic carbon atoms, and in which a+b together preferably total not more than 8 and a is preferably not greater than b+3.

Ar may be mononuclear, e.g. as in phenylene, fused polynuclear as in naphthalene or anthracene, or preferably has the structure

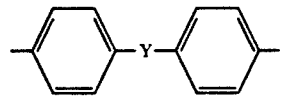

in which Y is a divalent link, e.g. —O—, —SO$_2$—, —CO— or —CH$_2$— or a substituted derivative of —CH$_2$— e.g.

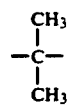

Suitably, one of the groups $R_4$ and $R_5$ is hydrogen and the other is methyl, or both $R_4$ and $R_5$ are hydrogen. That is, the diol may be prepared by reaction of propylene oxide or ethylene oxide with a phenolic compound having the structure HO-Ar-OH, preferably

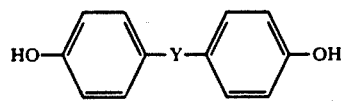

Preferably a+b is not greater than 4.

Diisocyanates containing cyclic groups which may be used to prepare the urethane prepolymer include, for example, diisocyanates in which the chain between the free valencies is provided with at least one aromatic group or at least one cycloaliphatic group, or in which the chain between the free valencies includes in combination at least one aromatic and at least one cycloaliphatic group.

Cycloaliphatic diisocyanates include for example, diisocyanates of the structure:

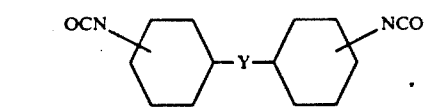

where —Y— is a divalent link which may be, for example, —CH$_2$— or substituted derivative thereof, —O—, —SO$_2$—, —CO—, and the isocyanate groups are linked meta- or para- to the groups Y. A particular example is 4,4'-dicyclohexylmethane diisocyanate.

Aromatic diisocyanates which may be used include, for examples, 2,4- or 2,6-tolylene diisocyanates, or mixtures thereof, in which case the divalent group B or X has the structure

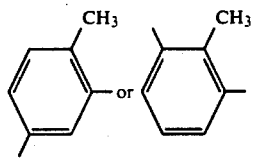

or a combination of said structures. Another suitable aromatic diisocyanate is that having the structure

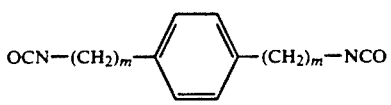

where m is a whole number chosen such that there are preferably not more than 20 atoms between cyclic groups in the urethane prepolymer derived therefrom. A suitable diisocyanate having the latter structure is xylylene diisocyanate.

Another suitable diisocyanate is that having the structure:

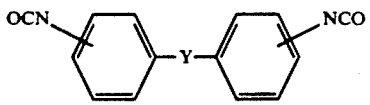

where Y is a divalent link which may have the designations hereinbefore described and in which the isocyanate groups are linked meta or para to the group Y. A preferred example is 4,4'-diisocyanatodiphenyl methane.

Diisocyanates which do not contain cyclic groups may be used in the production of the urethane prepolymer. Suitable such diisocyanates include, for example, tetramethylene diisocyanate, pentamethylene diisocyanate and hexamethylene diisocyanate, in which case the divalent group B or X will have the structure $-(CH_2)_4-$, $-(CH_2)_5-$ or $-(CH_2)_6-$.

Preferred isocyanates are 1,6-hexamethylenediisocyanate (HDI), trimethylhexamethylenediisocyanate (TMDI), isophoronediisocyanate (IPDI), toluene diisocyanate (TDI) and 4,4'-diphenyl methane diisocyanate (MDI), and combinations of these.

A polyisocyanate-containing material may be obtained by reacting a polyol of the formula $$R+OH)_x$$

with a diisocyanate of the formula $$OCN-R'-NCO$$

where the diisocyanate is used in a molar amount of 2(x) relative to the polyol. The reaction product obtained has the structure $$[Urethane+\sim(NCO)_x$$

and is reacted with a hydroxy-substituted alkyl (meth)acrylate of the formula $$CH_2=C(H, Me)-CO-O-R''-OH$$

which is used in a molar amount of 2(x) to provide a product of the formula $$[Urethane+\sim(CO-C(H, Me)=CH_2)_x.$$

In the above description, R is $C_{5-100}$ linear or branched or cyclic alkyl, x is an integer of from 4 to 10, R' is $C_{6-15}$ linear or branched or cyclic alkyl, and R'' is $C_{2-6}$ linear or branched or cyclic alkyl. Examples of $R(OH)_x$ include, when $R=C_5$ and $x=4$, pentaerythritol, a material of the formula $$HO-CH_2-C(CH_2OH)_3$$

Also when R is $C_{6-100}$ alkyl, x may be >4, e.g. the hydroxy-substituted polyester may be used for $R(OH)_x$.

Uses

The materials obtained by curing the two components used in the present invention may be used in any application in which polyurethanes are used. These applications include acoustic foams, building products, contact lenses, craniofacial reconstruction, cushioning, fibers, films, foam insulation, insulation, mouth protectors, packings, recreational surfaces, coatings, fabric coatings, concrete waterproofing, leather coatings, magnetic tape binders, elastomeric blends, sealing applications, etc.

A salient advantage of the compositions of the present invention is their curing characteristics. The compositions readily cure at temperatures below 120° C., preferably below 100° C., and they can also be cured easily at room temperature.

One of the uses of the present compositions is in coating varied articles which may be coated with polyurethane coatings. These articles include e.g., automobiles (e.g. exterior of automobiles, etc.), fabrics (e.g. raincoats, clothing, shoes, umbrellas), etc. These articles may be obtained by using known procedures used with polyurethanes. The present compositions can also be used as sealants (e.g. for double pane windows).

Coatings and articles in accordance with the present invention are obtained by curing at least one of the polymers functionalized with acetoacetyl groups together with at least one NCO-free urethane functionalized with unsaturated end groups in the presence of a catalyst. The catalysts used must have a pKa of from 12 to 14. Suitable catalysts which may be used include 1,8-diaza-[5.4.0]-bicycloundecene, tetramethyl guanidine, 1,4-dihydropyridine, and 2-allyl-N-alkylimidazoline.

The acetoacetylated acrylic resin and/or acetoacetylated polyester resin component, on the one hand, and the NCO-free resin component, on the other hand, are reacted in an amount of 1 to 0.8 to 1.2, respectively, preferably 1 to ca. 1, these amounts being measured in equivalents of acetoacetyl groups to equivalents of vinylic groups in the NCO-free resin. The catalyst is used in an amount of 0.2 to 3.0 wt. %, preferably 0.2 to 1.0 wt. %. These amounts are based on the amount of resin solid.

The two-component coating systems of the present invention are isocyanate-free. They are easy to apply using known techniques, requiring the use of only conventional existing equipment without the need for taking special safety precautions. The coatings and articles obtained from these compositions possess the outstanding performance characteristics of polyurethanes.

Other features of the invention will become apparent in the course of the following descriptions of exemplary embodiments which are given for illustration of the invention and are not intended to be limiting thereof.

The list below identifies the abbreviations used in the experimental section.

| MATERIALS | SOURCE |
| --- | --- |
| 1. Acetoacetoxyethyl Methacrylate Monomer (AAEM) CAS No. 21282-97-3 | EASTMAN CHEMICAL |
| 2. Butyl Acrylate Monomer (BA) CAS No. 141-32-2 | ROHM & HAAS |
| 3. Butyl Methacrylate Monomer (BMA) CAS No. 97-88-1 | ROHM & HAAS |
| 4. n-Butyl Acetate CAS No. 123-86-4 | UNION CARBIDE |
| 5. BYK 300 (Paint Additive) | BYL MALLINCKRODT CHEMISCHE PRODUKTE |
| 6. BYK 306 (Paint Additive) | BYK MALLINCKRODT CHEMISCHE PRODUKTE |
| 7. Desmodur H 1,6-Hexamethylene Diisocyanate (HDI) CAS No. 822-06-0 | MOBAY CHEMICAL CORP. |
| 8. Desmodur W Methylene Bis(4-cyclohexylisocyanate) CAS No. | MOBAY CHEMICAL CORP. |
| 9. 1,8-Diaza-bicyclo[5,4,0] undecene-7 (Amicure DBU/DBU) CAS No. 6674-22-2 | AIR PRODUCT |
| 10. Ektapro EEP Solvent (EEP) CAS No. | EASTMAN CHEMICAL |
| 11. 1,6-Hexanediol Diacrylate (HDODA) CAS No. 13048-33-4 | INTEREZ |
| 12. High Flass Naphtha (Unical 86) CAS No. | WARUM CHEMICAL |
| 13. Hydroxyethyl Acrylate Monomer (ROCYL 420/HEA) CAS No. 818-61-1 | ROHM & HAAS |
| 14. Hydroxypropyl Acrylate | ROHM & HAAS |

-continued

| | |
|---|---|
| Monomer (ROCYL 430/HPA) CAS No. 25584-83-2 | |
| 15. Isophorone Diisocyanate (IPDI) CAS No. 4098-71-9 | HUELS |
| 16. IPDI-T 1890 L (Isocyanurate of IPDI) CAS No. | HUELS |
| 17. Isocyanate 81 (Modified 4,4'-Diphenylmethane Diisocyanate) CAS No. | BASF |
| 18. 4,4'-Diphenyl Methane Diisocyanate (MONDUR M, MDI) CAS No. | MOBAY |
| 19. Mercapto Ethanol CAS No. 60-24-2 | ALDRICH/BASF |
| 20. Methyl Methacrylate Monomer (MMA) CAS No. 80-62-6 | ROHM & HAAS |
| 21. MPA-2000 (Anti-setting agent) CAS No. | NL CHEMICALS |
| 22. Styrene Monomer CAS No. 100-42-5 | POLYSAR |
| 23. TIOXIDE RCR 60 (Titanium Dioxide, Pigment) CAS No. 13463-67-7 | TIOXIDE CORP. |
| 24. Toluene Diisocyanate (MONDUR TD-80 TDI) CAS No. | MOBAY |
| 25. Trimethylolpropane Ethoxy Triacrylate (TMPEOTA) CAS No. 28961-43-5 | SARTOMER |
| 26. Trimethylolpropane Triacrylate (TMPTA) CAS No. 15625-89-5 | INTEREZ |
| 27. Trimethylol Ethane (TME) CAS No. 77-85-0 | IMC |
| 28. Trimethylol Propane (TMP) CAS No. 77-99-6 | CELANESE |
| 29. Trimethylhexamethylene Diisocyanate (TMDI) CAS No. 16938-22-0 | HUELS |
| 30. VAZO 67 2,2'-Azobis(2-Methyl-butyronitrile) CAS No. 13472-08-7 | DU PONT |
| 31. VAZO 64 Azobisisobutyronitrile CAS No. 78-67-1 | DU PONT |
| 32. Xylol CAS No. 1330-20-7 | HARRISONS & CROSSFIELD |
| 33. Propylene Glycol Monomethyl Ether Acetate (EKTASOLVE PM Acetate, PMA) CAS No. | EASTMAN CHEMICAL |
| 34. Monomethyl Ether of Hydroquinone (MEHQ) CAS No. 150-76-5 | EASTMAN CHEMICAL |
| 35. Dibutyltin Dilaurate (T-12, DBTL) CAS No. 77-58-7 | M & T CHEMICAL |
| 36. Methyl Ethyl Ketone (MEK) CAS No. 78-93-3 | HARRISON & CROSSFIELD |

FORMULATIONS OF TWO COMPONENT NCO-FREE WHITE PAINT

RAW MATERIALS OF PART ONE:
1. White Paint - A -- Resin A, GX-75-146
2. White Paint - B -- Resin B, GX-75-162

RAW MATERIALS OF PART TWO:
2. ETMPTA -- Ethoxylated trimethylolpropane triacrylate
4. NCO-free acrylic urethane-B (NFAU-B) GX-81-170
5. NCO-free acrylic urethane-C (NFAU-C) GX-87-3
6. NCO-free acrylic urethane-D (NFAU-D) GX-87-37
7. NCO-free acrylic urethane D (NFAU-D) GX-87-37

CATALYST:
DBU -- 1,8-diaza-[5,4,0]-bicycloundecene.

NCO-FREE WHITE ACRYLIC ENAMEL FORMULATION

-continued

PART ONE: White Paint-X
  Where, X = White Paint-A, White Paint-B or White Paint-A, and White Paint-B.
PART TWO: Crosslinking Agent-Y
  Where, Y = TMPTA, ETMPTA or TMPTA and ETMPTA
EQ. WT. Ratio of Part One/Part Two = 1/0.8-1
CATALYST: DBU, 0.4–1.0% TRS

NCO-FREE WHITE ACRYLIC-URETHANE ENAMEL FORMULATION

PART ONE: White Paint-X
  Where, X = White Paint-A, White Paint-B or White Paint-A, and White Paint-B.
PART TWO: Crosslinking Agent-Y
  Where, Y = NFAU-A, NFAU-B, NFAU-C, NFAU-D, NFAU-E or mixture of both e.g., NFAU-A/NFAU-B, ETMPTA/NFAU-D, NFAU-D/NFAU-E etc.
EQ. WT. Ratio of Part One/Part Two = 1/0.8–1.0
CATALYST: DBU, 0.4–1.0% TRS Preparation of hydroxy-group containing polyester:
GX-60-178 (GX-59-67):

RAW MATERIALS
| | |
|---|---|
| A. Neopentyl Glycol (EASTMAN) | 944.4 GMS |
| B. Pentaerythritol (CELANESE) | 126.6 GMS |
| C. Isophthalic Acid (AMOCO) | 874.9 GMS |
| D. Adipic Acid (BASF) | 493.9 GMS |
| E. Benzoic Acid (BAYER) | 143.8 GMS |
| | 2583.5 GMS |

PROCEDURE
1. Charge neopentyl glycol and adipic acid into a 5-L flask equipped with agitator, sample tube, thermometer, nitrogen purge, packed partial condenser, water trap and total condenser.
2. Increase temperature to 130 + 5 C. at 130 C. weigh in isophthalic acid, pentaerythritol and benzoic acid.
3. Heat to 215 + 5 C. (max.) and maintaining an exit vapor temperature at 100 + 5 C. (max.) on partial condenser until the distillate exit temperature falls below 90 C. Allow reaction mixture to cool to 150 C.
4. Remove the packed partial condenser and start addition of xylol to establish solvent reflux processing and hold at 215 + 5 C. until an acid value of 10 is reached.
5. Cool to 150 C. and dilute to 80 NVM % with n-butyl acetate.

SPECIFICATIONS:
| | |
|---|---|
| Solids content % | 80 |
| Viscosity | 88", Z4-5 |
| AN | 10 |
| Color | 1 |
| WPG (IMP.) | 11.0 |
| Solvent | n-butyl acetate |
| —OH, Eq. Wt. (solids) | 708 |

Preparation of hydroxy-group containing polyester:
GX-60-163 (GX-59-80):

RAW MATERIALS
| | |
|---|---|
| A. Adipic Acid (BASF) | 1523.5 GMS |
| B. Trimethylol Propane (CELANESE) | 561.0 GMS |
| C. Propylene Glycol (DOW) | 816.0 GMS |
| | 2900.5 GMS |

PROCEDURE
1. Charge adipic acid, trimethylol propane, and propylene glycol into a 5-L flask equipped with agitator, sample tube, thermometer, nitrogen sparge, packed partial condenser, water trap and total condenser.
2. Heat to 215 + 5 C. (max.) and maintaining an exit vapor temperature at 100 + 5 C. (max.) on partial condenser until the distillate exit temperature falls below 90 C. Allow reaction mixture to cool to 150 C.
3. Remove the packed partial condenser and start addition of xylol to establish solvent reflux processing and hold at 215 + 5 C. until an acid value of <5 is reached.

SPECIFICATIONS:
| | |
|---|---|
| Solids content % | 96 |

| | |
|---|---|
| Viscosity | 88", Z4-5 |
| AN | 1.5 |
| Color | 1 |
| WPG (IMP.) | 11.4 |
| Solvent | xylol |
| —OH. Eq. Wt. (solids) | 192 |

Preparation of hydroxy-group containing polyester: GX-60-156 (GX-59-79):

RAW MATERIALS

| | |
|---|---|
| A. Adipic Acid (BASF) | 1385.0 GMS |
| B. Trimethylol Propane (CELANESE) | 510.0 GMS |
| C. Ethylene Glycol (STANCHEM) | 605.0 GMS |
| | 2500.0 GMS |

PROCEDURE

1. Charge adipic acid, trimethylol propane, and ethylene glycol into a 5-L flask equipped with agitator, sample tube, thermometer, nitrogen sparge, packed partial condenser, water trap and total condenser.
3. Heat to 215 + 5 C. (max.) and maintaining an exit vapor temperature at 100 + 5 C. (max.) on partial condenser until the distillate exit temperature falls below 90 C. Allow reaction mixture to cool to 150 C.
4. Remove the packed partial condenser and start addition of xylol to establish solvent reflux processing and hold at 215 + 5 C. until an acid value of <5 is reached.
5. Cool to 150 C. and dilute to 80 NVM % with n-butyl acetate.

SPECIFICATIONS:

| | |
|---|---|
| Solids content % | 97 |
| Viscosity | 52", Z3-4 |
| AN | 0.5 |
| Color | 1 |
| WPG (IMP.) | 11.8 |
| Solvent | xylol |
| —OH. Eq. Wt. (solids) | 181 |

NCO-FREE ACRYLIC WHITE PAINT A
PART 1
GRIND PASTE
GX-82-10(GX-75-106)

PREMIX

| | |
|---|---|
| GP-GX-75-146 (NCO-free acrylic) | 268.5 GMS |
| Xylol | 80.5 GMS |
| EEP | 40.0 GMS |
| MPA-2000X | 3.6 GMS |
| BYK 300 | 2.9 GMS |

DISPERSE AT HIGH SPEED IN A COWELS STIRRER FOR 15 MINUTES

SIFT IN

| | |
|---|---|
| Tioxide RCR 60 | 220.0 GMS |

DISPERSE AT HIGH SPEED AGAIN FOR 30 MINUTES AND THEN SANDMILL TO 7H

MILL CLEANUP

| | |
|---|---|
| GP-GX-75-146 | 68.3 GMS |
| Xylol | 20.0 GMS |
| PREMIX FOR MILL FLUSH | |
| Xylol | 60.0 GMS |
| EEP | 30.0 GMS |

LETDOWN MIXTURE

| | |
|---|---|
| GP-GX-75-146 | 214.7 GMS |
| n-Butyl acetate | 40.0 GMS |
| PREMIX FOR LETDOWN | |

SPECIFICATIONS

| | |
|---|---|
| Viscosity (Stormer) | 62 KU |
| Dispersion (Hegmen) | 7 H |
| Hiding (Criptometer) | 894 |
| SAG (thousand of an inch) | 4-5 |
| Solids content %, by wt. | 48.0 |

NCO-FREE ACRYLIC RESIN (GX-75-146)

RAW MATERIALS

| | |
|---|---|
| A. Methyl methacrylate | 263.7 GMS |
| Butyl methacrylate | 300.0 GMS |
| Acetoacetoxyethyl methacrylate | 196.3 GMS |
| B. VAZO 64 | 8.0 GMS |
| PMA/Xylol (20/80) | 255.0 GMS |
| C. Xylol | 503.0 GMS |
| D. Mercapto ethanol | 0.3 CC |

PROCEDURE

1. Charge RM-C into 3 L flask. Place RM-A and RM-B in respective addition funnels.
2. Heat xylol to 105 + 5 C. and then start addition of RM-A and RM-B at a rate indicated on data and results. Maintain temperature at 105 + 5 C.
3. Once RM-A and RM-B are completely added, wait for one hour then take the first sample and add 0.3 g of VAZO 64 into reaction flask.
4. For every 30 minutes, take sample add add 0.3 g of VAZO 64.
5. If the solids content of sample reached 49.5% of NVM, add another 0.3 g of VAZO 64 and wait for 30 minutes. Then turn off heat, add 0.3 CC of RM-D.

CHARACTERISTICS

| | |
|---|---|
| NVM % | 50 + 1 |
| A.N. | 20 + 1 |
| Viscosity | U |
| Color | 1 |
| WPG | 9.90 + 0.05 |
| Solvent | Xylol |
| Mn | 15145 |
| Polydisp | 1.7965 |

NCO-FREE ACRYLIC WHITE PAINT A
PART 1
GRIND PASTE
GX-82-11(GX-75-108)

PREMIX

| | |
|---|---|
| GP-GX-75-162 (Acrylic polymer) | 250.0 GMS |
| Xylol | 90.0 GMS |
| High flash napht. | 30.0 GMS |
| MPA-2000X | 3.6 GMS |
| BYK 300 | 3.0 GMS |

HSD AT HIGH SPEED FOR 15 MINUTES

SIFT IN

| | |
|---|---|
| Tioxide RCR 60 | 280.0 GMS |

HSD FOR 30 MINUTES AND THEN SANDMILL TO 7H

MILL CLEANUP

| | |
|---|---|
| GP-GX-75-162 | 65.0 GMS |
| Xylol | 22.0 GMS |
| PREMIX FOR MILL FLUSH | |
| Xylol | 60.0 GMS |
| High flash napth. | 20.0 GMS |
| PREMIX FOR MILL RINSE | |

LETDOWN MIXTURE

| | |
|---|---|
| GP-GX-75-162 | 200.5 GMS |
| Xylol | 30.0 GMS |
| PREMIX FOR LETDOWN | |

SPECIFICATION:

| | |
|---|---|
| Viscosity | 63 KU |
| Dispersion | 7 H |
| Hiding | 970 |
| SAG | 4-5 |
| Solids content %, BY wt. | 56.7 |

NCO-FREE ACRYLIC RESIN (GX-75-162)

RAW MATERIALS

| | |
|---|---|
| A. Butyl acrylate | 294.6 GMS |
| Styrene | 232.8 GMS |
| Acetoacetoxyethyl methacrylate | 232.4 GMS |
| B. VAZO 64 | 8.0 GMS |
| PMA/Xylol (20/80) | 255.0 GMS |
| C. Xylol | 250.0 GMS |
| D. Mercapto ethanol | 0.3 CC |

PROCEDURE

1. Charge RM-C (xylol) into 3 L flask. Place RM-A (monomers) and RM-B (initiator solution) in respective addition funnels.
2. Heat xylol to 105 + 5 C. and then start addition of RM-A and RM-B at a rate indicated on data and results. Maintain temperature at 105 + 5 C.
3. Once RM-A and RM-B are completely added, wait for one hour then take first sample and add 0.3 g of VAZO 67 into reaction flask.
4. For every 30 minutes, take sample add add 0.3 g of VAZO 67.

-continued

5. If the solids content of sample reached 59.5% NVM, add one more 0.3 g of VAZO 67 and wait for at least 30 minutes, then remove heat, add 0.3 CC of RM-D (mercapto ethanol).

SPECIFICATIONS

| | |
|---|---|
| NVM % | 60 + 1 |
| A.N. | 20 + 1 |
| Viscosity | V |
| Color | 1 |
| WPG | 10.00 + 0.05 |
| Solvent | Xylol |
| Mn | 13390 |
| Polydisp | 2.5530 |

NFAU - A
NCO-FREE ACRYLIC URETHANE
GX-87-52

RAW MATERIALS

| | | |
|---|---|---|
| A. | IPDI-T 1890 L | 700.00 GMS |
| B. | Hydroxypropyl acrylate | 247.00 GMS |
| | MEHQ | 0.05 GMS |
| C. | DBTL (T-12) | 0.37 GMS |
| | n-Butyl acetate | 5.00 GMS |
| D. | n-Butyl acetate | 105.43 GMS |
| | | 1057.85 GMS |

PROCEDURE

1. Charge RM-A, RM-D and RM-C into reactor at R.T.
2. Heat to 75 + 5 C. and maintain at 75 + 5 C. when RM-B is added within one hour under dry pressure air.
3. Hold the reactor temperature at 75 + 5 C. until NCO % drop to 1.0% cool to 60 + 5 C. and 20 ml of MEOH is added.
4. Maintain at 60 + 5 C. until NCO % = 0.0

SPECIFICATIONS

| | |
|---|---|
| NVM % | 73.8 |
| Viscosity (Gardner) | 58", Z3-4 |
| Color (Gardner) | 1 |
| NCO % | 0.0 |
| WPG (IMP.) (SP. GR.) | 10.57 |
| Solvent | n-butyl acetate |
| Eq. Wt. | 387.89 (solids) |
| | 525.1 (73.87%) |

NFAU - B
NCO-FREE ACRYLIC URETHANE
GX-81-170 (GX-75-159)

RAW MATERIALS

| | | |
|---|---|---|
| A. | Trimethylol propane (TMP) | 112.50 GMS |
| | MEK | 250.00 GMS |
| B. | Isophorone diisocyanate (IPDI) | 555.50 GMS |
| | MEK | 58.33 GMS |
| C. | Hydroxyethyl acrylate (HEA) | 252.80 GMS |
| | HQME | .05 GMS |
| D. | T-12 | .94 GMS |
| | MEK | 5.25 GMS |
| | | 1235.37 GMS |

PROCEDURE

1. Charge RM-A into reactor at room temperature.
2. Hold at 20-30 C. when RM-B is added within 15 minutes.
3. Heat to 80 + 5 C. and maintain at 80 + 5 C. until NCO % reduced to 10.
4. Continue to hold at 80 + 5 C. with RM-C is added within 15 minutes.
5. Maintain the reaction solution at 80 + 5 C. until NCO % drops to 0.5, cool to 60 + 5 C. and then 15 ml of methanol is added.
6. Hold at 60 + 5 C. until NCO % = 0.

SPECIFICATIONS

| | |
|---|---|
| NVM % | 78 |
| Viscosity | Z6 |
| Red. Vis. | 10.8", W |
| | at 70% NVM |
| Color | 1 |
| NCO% | 0.0 |
| WPG | 10.63 |
| Solvent | MEK |

NFAU - C
NCO-FREE ACRYLIC URETHANE
GX-87-3 (GX-75-160)

RAW MATERIALS

| | | |
|---|---|---|
| A. | Trimethylol propane (TMP) | 130.44 GMS |
| | MEK | 293.00 GMS |
| B. | Desmodur H | 487.54 GMS |
| | MEK | 113.04 GMS |
| C. | Hydroxyethyl acrylate (HEA) | 314.40 GMS |
| | HQME | .06 GMS |
| D. | T-12 | .49 GMS |
| | MEK | 5.20 GMS |
| | | 1344.11 GMS |

PROCEDURE

1. Charge RM-A into reactor at room temperature.
2. Hold at 20-25 C. when RM-B is added within 15 minutes.
3. Cool down to 15 + 5 C. when RM-D is added within 5 minutes.
4. Heat to 50-60 C. and maintain at 50-60 C. until NCO % reduced to a value of 12.0 [4-20% (9-12 preferred)].
5. Hold at 50-60 C. when RM-C is added within 15 minutes.
6. Maintain at 50-60 C. until NCO % reduced to 0.5 and then 15 ml of methanol is added.
7. Hold at 50-60 C. until NCO % = 0.

SPECIFICATIONS

| | |
|---|---|
| NVM % | 72.57 |
| Viscosity | 11", V |
| Color | 1 |
| NCO % | 0.0 |
| WPG | 10.47 |
| Solvent | MEK |

NFAU - D
GX-87-37 (GX-75-167)

RAW MATERIALS

| | | |
|---|---|---|
| A. | Trimethy hexamethylene diisocyanate (TMDI) | 210.00 GMS |
| B. | Hydroxypropyl acrylate (HPA) | 247.00 GMS |
| C. | DBTL (T-12) | .25 GMS |
| D. | MEK | .05 GMS |
| | | 571.30 GMS |

PROCEDURE

1. Charge RM-A, RM-D and RM-C into reactor at room temperature.
2. Heat to 65 + 5 C. and hold at 65 + 5 C. when RM-B and RM-E are added.
3. Maintain the reaction temperature at 65 + 5 C. until NCO % down into 1.0 and 15 ml of methanol is added.
4. Hold at 65 + 5 C. until NCO % = 0.

SPECIFICATIONS

| | |
|---|---|
| Solids Content | 78.3 |
| Viscosity | C |
| Color | 1 |
| NCO % | 0.0 |
| WPG (IMP) | 10.41 |
| Solvent | MEK |

NFAU - E
GX-87-44

RAW MATERIALS

| | | |
|---|---|---|
| A. | Trimethylol propane (TMP) | 115.30 GMS |
| | MEK | 268.00 GMS |
| B. | Trimethyl hexamethylene diisocyanate (TMDI) | 538.80 GMS |
| | MEK | 50.00 GMS |
| C. | Hydroxypropyl acrylate (HPA) | 268.06 GMS |
| | HQME | 0.06 GMS |
| D. | T-12 | 0.30 GMS |
| | MEK | 5.50 GMS |
| | | 1246.69 GMS |

PROCEDURE

1. Charge RM-A into reactor at room temperature.
2. Hold at 20-25 C. when RM-B is added (30 minutes) under N and then RM-D is added.
3. Heat to 65 + 5 C. and maintain at 65 + 5 C. until NCO % reduced to 10.0%.
4. Continue to hold at 65 + 5 C. when RM-C is added within one hour.
5. Maintain at 65 + 5 C. until NCO % down to 1.0% and then 15 ml of methanol is added.

| | |
|---|---|
| 6. Hold at 65 + 5 C. until NCO % = 0. | |
| SPECIFICATIONS | |
| Solids content % | 75.0 |
| Viscosity | 12", W-X |
| Colour | 1 |
| NCO % | 0.0 |
| WPG (IMP) | 10.23 |

| GP-GX-81-155 | NCO-FREE ACRYLIC PAINT GRIND PASTE | COLOR: RED |
|---|---|---|
| PREMIX | | |
| GP-GX-75-162 Acrylic polymer | | 125.0 GMS |
| Xylol | | 45.0 GMS |
| MPA-2000X | | 3.6 GMS |
| BYK 300 | | 3.0 GMS |
| HSD AT HIGH SPEED FOR 15 MINUTES | | |
| SIFT IN | | |
| Moly Orange 2565 | | 65.1 GMS |
| Host Violet ER02 | | 8.9 GMS |
| Bon-Maroon-6002 | | 0.9 GMS |
| HSD FOR 30 MINUTES AND THEN SANDMILL TO 7H | | |
| MILL CLEANUP | | |
| GP-GX-75-162 | | 105.0 GMS |
| Xylol | | 15.0 GMS |
| PREMIX FOR MILL FLUSH | | |
| Xylol | | 95.0 GMS |
| LETDOWN MIXTURE | | |
| GP-GX-75-162 | | 368.0 GMS |
| Xylol | | 100.00 GMS |
| PREMIX FOR LETDOWN | | |
| SPECIFICATION: | | |
| Viscosity | | 58 KU |
| Dispersion | | 7 H |
| Hiding | | 646 |
| SAG | | 6-7 |
| Solids content %, By V. | | 41.2 |
| Total paint | | 934.5 GMS |

| GP-GX-81-137 | NCO-FREE ACRYLIC PAINT GRIND PASTE | COLOR: GREEN |
|---|---|---|
| PREMIX | | |
| GP-GX-75-162 | | 268.5 GMS |
| Xylol | | 28.8 GMS |
| MPA-2000X | | 3.6 GMS |
| BYK 300 | | 3.0 GMS |
| HSD AT HIGH SPEED FOR 15 MINUTES | | |
| SIFT IN | | |
| I.A.F. Compound | | 1.8 GMS |
| Sandor-Green-GLS | | 2.4 GMS |
| LT Yel 09-425 2P | | 73.3 GMS |
| Irgalit-Blue-BCA | | 1.8 GMS |
| Tioxide RCR 60 | | 3.6 GMS |
| Regal 400R Black | | 0.3 GMS |
| HSD FOR 30 MINUTES AND THEN SANDMILL TO 7H | | |
| MILL CLEANUP | | |
| GP-GX-75-162 | | 74.8 GMS |
| Xylol | | 30.0 GMS |
| PREMIX FOR MILL FLUSH | | |
| Xylol | | 82.7 GMS |
| FOR MILL RINSE | | |
| LETDOWN MIXTURE | | |
| GP-GX-75-162 | | 543.9 GMS |
| Xylol | | 92.1 GMS |
| PREMIX FOR LETDOWN | | |
| SPECIFICATION: | | |
| Viscosity | | 60 KU |
| Dispersion | | 7 H |
| Hiding | | 726 |
| SAG | | 6-7 |
| Solids content %, By V. | | 43.63 |
| Total paint | | 990.3 GMS |

| GP-GX-81-148 | NCO-FREE ACRYLIC PAINT GRIND PASTE | COLOR: YELLOW |
|---|---|---|
| PREMIX | | |
| GP-GX-75-162 | | 236.4 GMS |
| Xylol | | 127.2 GMS |
| MPA-2000X | | 3.8 GMS |
| BYK 300 | | 3.1 GMS |
| HSD AT HIGH SPEED FOR 15 MINUTES | | |
| SIFT IN | | |
| Light Yel 2361 | | 142.2 GMS |
| Tioxide RCR 60 | | 52.3 GMS |
| Chrome Yel 2165 | | 47.4 GMS |
| Ferrite-Yel-305 | | 7.2 GMS |
| HSD FOR 30 MINUTES AND THEN SANDMILL TO 7H | | |
| MILL CLEANUP | | |
| GP-GX-75-162 | | 100.0 GMS |
| Xylol | | 39.1 GMS |
| PREMIX FOR MILL FLUSH | | |
| Xylol | | 80.9 GMS |
| LETDOWN MIXTURE | | |
| GP-GX-75-162 | | 236.4 GMS |
| Xylol | | 42.7 GMS |
| PREMIX FOR LETDOWN | | |
| SPECIFICATION: | | |
| Viscosity | | 61 KU |
| Dispersion | | 7 H |
| Hiding | | 894 |
| SAG | | 4-5 |
| Solids content %, By V. | | 40.8 |
| Total paint | | 1118.7 GMS |

FORMULATIONS OF TWO COMPONENT NCO-FREE WHITE PAINT

RAW MATERIALS OF PART ONE:
1. White Paint - A -- Resin A, GX-75-146
2. White Paint - B -- Resin B, GX-75-162

RAW MATERIALS OF PART TWO:
1. TMPTA -- Trimethylolpropane triacrylate.
2. ETMPTA -- Ethoxylated trimethylolpropane triacrylate
3. NCO-free acrylic urethane-A (NFAU-A) -- GX-81-161
4. NCO-free acrylic urethane-B (NFAU-B) -- GX-81-170
5. NCO-free acrylic urethane-C (NFAU-C) -- GX-87-3
6. NCO-free acrylic urethane-D (NFAU-D) -- GX-87-37
7. Acrylic urethane-E -- GX-87-44

CATALYST:
DBU -- 1,8-diaza-[5,4,0]-bicycloundecene.

NCO-FREE WHITE ACRYLIC ENAMEL FORMULATION:

PART ONE: White Paint-X
Where, X = White Paint-A, White Paint-B or White Paint-A, and White Paint-B.
PART TWO: Crosslinking Agent-Y
Where, Y = TMPTA, ETMPTA or TMPTA and ETMPTA.
EQ. WT. Ratio of Part One/Part Two = 1/0.8-1
CATALYST: DBU, 0.4-1.0% TRS

NCO-FREE WHITE ACRYLIC-URETHANE ENAMEL FORMULATION:

PART ONE: White Paint-X
Where, X = White Paint-A, White Paint-B or White Paint-A and White Paint-B.
PART TWO: Crosslinking Agent-Y
Where, Y = NFAU-A, NFAU-B, NFAU-C, NFAU-D NFAU-E or mixture of both e.g., NFAU-A/NFAU-B, NFAU-D/NFAU-E etc.
EQ. WT. Ratio of Part One/Part Two = 1/0.8-1.0
CATALYST: DBU 0.4-1.0% TRS Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polymer obtained by curing, using a base catalyst, a first component and a second component, wherein said first component comprises at least one acetoacetylated polymer resin and wherein said second component comprises at least one NCO-free urethane polymer resin having vinylic end groups, wherein said base catalyst is tetramethylguanidine.

2. A polymer obtained by curing a first component and a second component in the presence of a base catalyst, wherein:
(i) said first component comprises at least one acetoacetylated polymer resin; and
(ii) said second component comprises at least one NCO-free urethane polymer having vinylic end groups and corresponding to one of formula (iv) to (vi); wherein formula (iv) is:

$$CH_2=C(R^1)-CO-O-R^2-O-(CO-NH-B-NH-CO-O-A-O)_nCO-NH-B-NH-CO-O-R^2-O-CO-C(R^1)=CH_2$$

formula (v) is:

$$(CH_2=C(R^1)COOR^2OCONH)_mX, \text{ and}$$

formula (vi) is:

$$(CH_2=C(R^1)COOR_2OCOHNBNHCOO)_pA$$

wherein:
each $R^1$ is independently H or $CH_3$;
each $R_2$ is independently a $C_{2-3}$ linear or branched saturated alkylene moiety;
each B is independently a $C_{2-12}$ linear or branched saturated alkylene moiety, or a $C_{4-14}$ cyclic saturated alkylene moiety, or a $C_{6-12}$ arylene moiety;
each A is independently a $C_{2-12}$ linear or branched saturated alkylene moiety, or a $C_{4-12}$ cyclic saturated alkylene moiety, or a $C_{6-12}$ arylene moiety;
X is a $C_{2-12}$ linear or branched saturated alkylene moiety, or a $C_{4-12}$ cyclic saturated alkylene moiety, or a $C_{6-12}$ arylene moiety;
n is an integer of from 1 to 10;
m is 2, 3 or 4; and
p is 2, 3 or 4, wherein said base catalyst is tetramethylguandine.

3. The polymer of claim 1, wherein said acetoacetylated polymer resin is a (meth)acrylic resin which is a copolymer obtained by copolymerizing 10 to 60 wt. % of a monomer of formula (I)

$$CH=C(R^1)-COO-CH_2CH_2-O-CO-CH_2-CO-CH_3 \quad (I)$$

with 90 to 40 wt. % of an alkyl (meth)acrylate of formula (II)

$$CH_2=C(R)-CO-OR$$

wherein R is $C_{1-12}$ linear or branched saturated alkyl and $R^1$ is H or $CH_3$.

4. The polymer of claim 3, wherein said NCO-free urethane polymer is a polymer of formula (IV)

$$CH_2=C(R^1)-CO-O-R^2-O-(CO-NH-B-NH-CO-O-A-O)_nCO-NH-B-NH-CO-O-R^2-O-CO-C(R^1)=CH_2 \quad (IV)$$

wherein:
each $R^1$ is independently H or $CH_3$;
each $R^2$ is independently a $C_{2-3}$ linear or branched saturated alkylene moiety;
each B is independently a $C_{2-12}$ linear or branched saturated alkylene moiety, or a $C_{4-12}$ cyclic saturated alkylene moiety, or a $C_{6-14}$ arylene moiety;
each A is independently a $C_{2-12}$ linear or branched saturated alkylene moiety, or a $C_{4-12}$ cyclic saturated alkylene mioiety, or a $C_{6-14}$ arylene moiety; and
n is an integer of from 1 to 10.

5. The polymer of claim 3, wherein said NCO-free urethane polymer is a polymer of formula (V):

$$(CH_2=C(R^1)CO-O-R^2O-CO-NH)_mX \quad (V)$$

wherein:
each $R^1$ is independently H or $CH_3$;
each $R^2$ is independently a $C_{2-3}$ linear or branched saturated alkylene moiety;
X is a $C_{2-12}$ linear or branched saturated alkylene moiety, or a $C_{4-12}$ cyclic saturated alkylene moiety, or a $C_{6-14}$ arylene moiety; and
m is 2, 3 or 4.

6. The polymer of claim 3, wherein said NCO-free urethane polymer is a polymer obtained by:
(1) reacting a reaction mixture of a $C_{2-12}$ linear, branched or cyclic alkyl or aryl polyol having an average of 2 to 4 hydroxyl groups per molecule and a $C_{2-14}$ linear, branched or cyclic saturated alkyl or aryl diisocyanate, triisocyanate, tetraiisocyanate, or a mixture thereof, at 5° to 20° C., using a molar ratio of OH groups to NCO lowers than 1.0;
(2) raising the temperature of the mixture of step (1) to 40° to 150° C. and maintaining said temperature at 40° to 150° C. until an NCO content of 4 to 20 wt. % in the reaction mixture is reached;
(3) adding a hydroxyl substituted alkyl (meth)acrylate of formula (III)

$$CH_2=C(R^1)-CO-O-R^2-OH \quad (III)$$

wherein: $R^1$ is H or $CH_3$; and $R^2$ is a $C_{2-3}$ linear or branched saturated alkylene moiety; and maintaining the temperature at 40° to 150° C. until the NCO content of the mixture is below 2 wt. %;
(4) adding to the reaction mixture a $C_{1-4}$ alcohol in an amount appropriate to obtain a molar ratio of OH groups to NCO groups greater than 1.5; and
(5) obtaining a NCO-free urethane polymer.

7. The polymer of claim 3, wherein said acetoacetylated (meth)acrylic resin is obtained by reacting said monomer of formula (I) with said alkyl (meth)acrylate of formula (II) and styrene.

8. The polymer of claim 1, wherein said acetoacetylated polymer resin is an acetoacetylated polyester resin obtained by either (1) subjecting hydroxyl group—containing polyester and a $C_{1-4}$ alkyl acetoacetate to a transesterification reaction, or (2) subjecting an unsaturated polyester and at least one monomer of formula (I)

$$CH_2=C(R^1)-COO-CH_2CH_2-O-CO-CH_2-CO-CH_3 \quad (I)$$

wherein $R^1$ is H or $CH_3$, to a graft polymerization reaction.

9. The polymer of claim 8, wherein said NCO-free urethane polymer is a polymer of formula (IV)

$$CH_2=C(R^1)-CO-O-R^2-O-(CO-NH-B-NH-CO-O-A-O)_nCO-N-$$

$$H-B-NH-CO-O-R^2-O-CO-C(R^1)=CH_2 \quad (IV)$$

wherein:
each $R^1$ is independently H or $CH_3$;
each $R^2$ is independently a $C_{2-3}$; linear or branched saturated alkylene moiety;
each B is independently a $C_{2-12}$ linear or branched saturated alkylene moiety, or a $C_{2-12}$ cyclic saturated alkylene moiety, or a $C_{6-14}$ arylene moiety;
each A is independently a $C_{2-12}$ linear or branched saturated alkylene moiety, or a $C_{4-12}$ cyclic saturated alkylene moiety, or a $C_{6-14}$ arylene moiety; and
n is an integer of from 1 to 10.

10. The polymer of claim 8, wherein said NCO-free urethane polymer is a polymer of formula (V):

$$(CH_2=C(R^1)CO-O-R^2-O-CONH)_mX \quad (V)$$

wherein:
each $R^1$ is independently H or $CH_3$;
each $R^2$ is independently a $C_{2-3}$ linear or branched saturated alkylene moiety;
X is a $C_{2-12}$ linear or branched saturated alkylene moiety, or a $C_{4-14}$ cyclic saturated alkylene moiety, or a $C_{6-14}$ arylene moiety; and
m is 2, 3 or 4.

11. The polymer of claim 8, wherein said NCO-free urethane polymer is a polymer obtained by:

(1) reacting a mixture of $C_{2-12}$ linear, branched or cyclic alkyl or aryl polyol having an average of 1 to 4 hydroxyl groups per molecule and a $C_{2-12}$ linear, branched or cyclic saturated alkyl or aryl diisocyanate, triisocyanate, tetraiisocyanate, or mixture thereof, at 5° to 20° C.;

(2) raising the temperature of the mixture of step (1) to 40° to 150° C. and maintaining said temperature at 40° to 150° C. until an NCO content of 4 to 20 wt. % in the reaction mixture is reached;

(3) adding a hydroxyl substituted alkyl (meth)acrylate of formula (III)

$$CH_2=C(R^1)-CO-O-R^2-OH \quad (III)$$

wherein: $R^1$ is H or $CH_3$; and $R^2$ is a $C_{2-3}$ linear or branched saturated alkylene moiety; and maintaining the temperature at 40° to 150° C. until the NCO content of the mixture is below 2 wt. %.

(4) adding to the reaction mixture a $C_{1-4}$ alcohol is an amount appropriate to obtain a molar ratio of OH groups to NCO groups greater than 1.5; and (5) obtaining an NCO-free urethane polymer.

12. A polymer obtained by curing a first component and a second component in the presence of a base catalyst, wherein:

(i) said first component comprises at lest one acetoacetylated polymer resin; and (ii) said second component comprises at least one NCO-free urethane polymer having vinylic end groups and corresponding to one of formula (iv) to (vi); wherein formula (iv) is:

$$CH_2=C(R^1)-CO-O-R^2-O-(CO-NH-B-NH-CO-O-A-O)_nCO-NH-B-NH-CO-O-R^2-O-CO-C(R^1)=CH_2$$

formula (v) is:

$$(CH_2=C(R^1) COOR^2OCONH)_mX, \text{ and}$$

formula (VI) is:

$$(CH_2=C(R^1)COOR_2OCONHBNHCOO)_pA$$

wherein:
each $R^1$ is independently H or $CH_3$;
each $R_2$ is independently a $C_{2-3}$ linear or branched saturated alkylene moiety;
each B is independently a $C_{2-12}$ linear or branched saturated alkylene moiety, or a $C_{4-14}$ cyclic saturated alkylene moiety, or a $C_{6-12}$ arylene moiety;
each A is independently a $C_{2-12}$ linear or branched saturated alkylene moiety, or a $C_{4-12}$ cyclic saturated alkylene moiety, or a $C_{6-12}$ arylene moiety;
X is a $C_{2-12}$ linear or branched saturated alkylene moiety, or a $C_{4-12}$ cyclic saturated alkylene moiety, or a $C_{6-12}$ arylene moiety;
n is an integer of from about 1 to 10;
m is 2, 3 or 4; and
p is 2, 3 or 4, wherein said base catalyst is 1,8-diazabicycloundecene.

13. A polymer obtained by curing, using a base catalyst, a first component and a second component, wherein said first component comprises at least one acetoacetylated polymer resin and wherein said second component comprises at least one NCO-free urethane polymer resin having vinylic end groups, wherein said base catalyst is 1,8-diaza-bicycloundecene.

14. The polymer of claim 13, wherein said acetoacetylated polymer resin is a (meth)acrylic resin which is a copolymer obtained by copolymerizing 10 to 60 wt. % of a monomer of formula (I)

$$CH=C(R^1)-COO-CH_2CH_2-O-CO-CH_2-CO-CH_3 \quad (I)$$

with 90 to 40 wt. % of an alkyl (meth)acrylate of formula (II)

$$CH_2=C(R^1)-CO-OR \quad (II)$$

wherein R is $C_{1-12}$ linear or branched saturated alkyl and $R^1$ is H or $CH_3$.

15. The polymer of claim 14, wherein said NCO-free urethane polymer is a polymer of formula (IV)

$$CH_2=C(R^1)-CO-O-R^2-O-(CO-NH-B-NH-CO-O-A-O)_nCO-NH-B-NH-CO-O-R^2-O-CO-C(R^1)=CH_2 \quad (IV)$$

wherein:
each $R^1$ is independently H or $CH_3$;
each $R^2$ is independently a $C_{2-3}$ linear or branched saturated alkylene moiety;
each B is independently a $C_{2-12}$ linear or branched saturated alkylene moiety, or a $C_{4-12}$ cyclic saturated alkylene moiety, or a $C_{6-14}$ arylene moiety;
each A is independently a $C_{2-12}$ linear or branched saturated alkylene moiety, or a $C_{4-12}$ cyclic saturated alkylene mioiety, or a $C_{6-14}$ arylene moiety; and
n is an integer of from 1 to 10.

16. The polymer of claim 14, wherein said NCO-free urethane polymer is a polymer of formula (V):

$$(CH_2=C(R^1)CO-O-R^2O-CO-NH)_mX \quad (V)$$

wherein:
each $R^1$ is independently H or $CH_3$;
each $R^2$ is independently a $C_{2-3}$ linear or branched saturated alkylene moiety;
X is a $C_{2-12}$ linear or branched saturated alkylene moiety, or a $C_{4-12}$ cyclic saturated alkylene moiety, or a $C_{6-14}$ arylene moiety; and
m is 2, 3 or 4.

17. The polymer of claim 14, wherein said NCO-free urethane polymer is a polymer obtained by:
(1) reacting a reaction mixture of a $C_{2-12}$ linear, branched or cyclic alkyl or aryl polyol having an average of 2 to 4 hydroxyl groups per molecule and a $C_{2-14}$ linear, branched or cyclic saturated alkyl or aryl diisocyanate, triisocyanate, tetraiisocyanate, or a mixture thereof, at 5° to 20° C., using a molar ratio of OH groups to NCO groups lower than 1.0;
(2) raising the temperature of the mixture of step (1) to 40° to 150° C. and maintaining said temperature at 40° to 150° C. until an NCO content of 4 to 20 wt. % in the reaction mixture is reached;
(3) adding a hydroxyl substituted alkyl (meth)acrylate of formula (III)

$$CH_2=C(R^1)-CO-O-R^2-OH \quad (III)$$

wherein: $R^1$ is H or $CH_3$; and $R^2$ is a $C_{2-3}$ linear or branched saturated alkylene moiety; and maintaining the temperature at 40° to 150° C. until the NCO content of the mixture is below 2 wt. %;
(4) adding to the reaction mixture a $C_{1-4}$ alcohol is an amount appropriate to obtain a molar ratio of OH groups to NCO groups greater than 1.5; and
(5) obtaining a NCO-free urethane polymer.

18. The polymer of claim 14, wherein said acetoacetylated (meth)acrylic resin is obtained by reacting said monomer of formula (I) with said alkyl (meth)acrylate of formula II) and styrene.

19. The polymer of claim 13, wherein said acetoacetylated polymer resin is an acetoacetylated polyester resin obtained by either (1) subjecting hydroxyl group-containing polyester and a $C_{1-4}$ alkyl acetoacetate to a transesterification reaction, or (2) subjecting an unsaturated polyester and at least one monomer of formula (I)

$$CH_2=C(R^1)-COO-CH_2CH_2-O-CO-CH_2-CO-CH_3 \quad (I)$$

wherein $R^1$ is H or $CH_3$, to a graft polymerization reaction.

20. The polymer of claim 19, wherein said NCO-free urethane polymer is a polymer of formula (IV)

$$CH_2=C(R^1)-CO-O-R^2-O-(CO-NH-B-NH-CO-O-A-O)_nCO-NH-B-NH-CO-O-R^2-O-CO-C(R^1)=CH_2 \quad (IV)$$

wherein:
each $R^1$ is independently H or $CH_3$;
each $R^2$ is independently a $C_{2-3}$; linear or branched saturated alkylene moiety;
each B is independently a $C_{2-12}$ linear or branched saturated alkylene moiety, or a $C_{2-12}$ cyclic saturated alkylene moiety, or a $C_{6-14}$ arylene moiety; p1
each A is independently a $C_{2-12}$ linear or branched saturated alkylene moiety, or a $C_{4-12}$ cyclic saturated alkylene moiety, or a $C_{6-14}$ arylene moiety; and
n is an integer of from 1 to 10.

21. The polymer of claim 19, wherein said NCO-free urethane polymer is a polymer of formula (V):

$$(CH_2=C(R^1)CO-O-R^2-O-CONH)_mX \quad (V)$$

wherein:
each $R^1$ is independently H or $CH_3$;
each $R^2$ is independently a $C_{2-3}$ linear or branched saturated alkylene moiety;
X is a $C_{2-12}$ linear or branched saturated alkylene moiety, or a $C_{4-14}$ cyclic saturated alkylene moiety, or a $C_{6-14}$ arylene moiety; and
m is 2, 3 or 4.

22. The polymer of claim 19, wherein said NCO-free urethane polymer is a polymer obtained by:
(1) reacting a mixture of a $C_{2-12}$ linear, branched or cyclic alkyl or aryl polyol having an average of 1 to 4 hydroxyl groups per molecule and a $C_{2-12}$ linear, branched or cyclic saturated alkyl or aryl diisocyanate, triisocyanate, tetraiisocyanate, or mixture thereof, at 5° to 20° C.;
(2) raising the temperature of the mixture of step (1) to 40° to 150° C. and maintaining said temperature at 40° to 150° C. until an NCO content of 4 to 20 wt. % in the reaction mixture is reached;
(3) adding a hydroxyl substituted alkyl (meth)acrylate of formula (III)

$$CH_2=C(R^1)-CO-O-R^2-OH \quad (III)$$

wherein: $R^1$ is H or $CH_3$; and $R^2$ is a $C_{2-3}$ linear or branched saturated alkylene moiety; and maintaining the temperature at 40° to 150° C. until the NCO content of the mixture is below 2 wt. %.
(4) adding to the reaction mixture a $C_{1-4}$ alcohol in an amount appropriate to obtain a molar ratio of OH groups to NCO groups greater than 1.5; and
(5) obtaining an NCO-free urethane polymer.

* * * * *

UNITED STATES PATENT AND TRADEMARK OFFICE
CERTIFICATE OF CORRECTION

PATENT NO. : 5,132,367
DATED : July 21, 1992
INVENTOR(S) : Paul Chan

It is certified that error appears in the above-indentified patent and that said Letters Patent is hereby corrected as shown below:

Column 1, line 33, "ad" should read --and--.

Column 2, line 15, "(meth-" should read --(meth--;
      line 20, "(vide infra)" should read --(*vide infra*)--.

Column 3, line 52, "thylenically" should read --ethylenically--;
      line 55, "1500" should read --1,500--.

Column 4, line 2, "1,1,4-trimethyl" should read --2,2,4-trimethyl--;
      line 14, "arylate" should read --acrylate--.

Column 5, line 57, "supra" should read --*supra*--.

Column 9, line 45, "R(OH)$_x$" should read --R$\pm$(OH)$_x$--

Column 14, line 12, delete "add" (first occurrence) and replace with --and--;
      line 68, delete "add" (first occurrence) and replace with --and--.

Column 17, line 6, "Colour" should read --Color--.

Column 19, line 24, "(CH$_2$=C(R$^1$)COOR$_2$OCOHNBNHCOO)$_p$A" should read --(CH$_2$=C(R$^1$)COOR$^2$OCONHBNHCOO)$_p$A--;
      line 54, "CH$_2$=C(R)-CO-OR" should read --CH$_2$=C(R$^1$)-CO-OR--.

line 28, "R$_2$" should read --R$^2$--.

UNITED STATES PATENT AND TRADEMARK OFFICE
CERTIFICATE OF CORRECTION

PATENT NO. : 5,132,367
DATED : July 21, 1992
INVENTOR(S) : Paul Chan

It is certified that error appears in the above-indentified patent and that said Letters Patent is hereby corrected as shown below:

```
Column 20, line 6, "mioiety" should read --moiety--;
          line 31, after "NCO" insert --groups--.

Column 21, line 50, "is" should read --in--.

Column 22, line 24, "1,8-diaza-" should read
     --1,8-diaza-[5.4.0]- --;
          line 32, "1,8-diaza-" should read
     --1,8-diaza-[5.4.0]- --.

Column 24, line 14, delete "p1".
```

Signed and Sealed this

Third Day of January, 1995

Attest:

BRUCE LEHMAN

*Attesting Officer*          *Commissioner of Patents and Trademarks*